US012531919B1

(12) United States Patent
Rao et al.

(10) Patent No.: US 12,531,919 B1
(45) Date of Patent: Jan. 20, 2026

(54) OPPORTUNISTIC QUALITY MODULATION USING SCENE FEEDBACK

(71) Applicant: Meta Platforms Technologies, LLC, Menlo Park, CA (US)

(72) Inventors: Bala Vishnu Shankar Rao, San Jose, CA (US); Rodney Hooker, Leander, TX (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 280 days.

(21) Appl. No.: 18/302,578

(22) Filed: Apr. 18, 2023

(51) Int. Cl.
*H04L 65/70* (2022.01)
*H04L 65/80* (2022.01)

(52) U.S. Cl.
CPC ............. *H04L 65/70* (2022.05); *H04L 65/80* (2013.01)

(58) Field of Classification Search
CPC ................................ H04L 65/70; H04L 65/80
See application file for complete search history.

(56) References Cited

U.S. PATENT DOCUMENTS

| | | | |
|---|---|---|---|
| 2010/0220650 A1* | 9/2010 | Rison | H04L 5/0044 370/328 |
| 2017/0085506 A1* | 3/2017 | Gordon | H04L 51/066 |
| 2022/0405043 A1* | 12/2022 | Mogul | G06F 3/165 |
| 2023/0010466 A1* | 1/2023 | Port | H04S 7/30 |
| 2024/0007127 A1* | 1/2024 | Sankaragomathi | H03M 3/498 |

* cited by examiner

*Primary Examiner* — Stella L. Woo
(74) *Attorney, Agent, or Firm* — Foley & Lardner LLP

(57) ABSTRACT

In particular embodiments, a first computing system may receive scene feedback information from a second computing system. The scene feedback information may include one or more of characteristics associated with the second computing system, one or more audio sources, and desired quality level for each of the one or more audio sources. The first computing system may adjust a quality of an audio sample for transmission to the second computing system based on the scene feedback information. The first computing system may select, based on adjusted quality of the audio sample, a portion of hardware circuit on the first computing system for encoding the audio sample. The first computing system may encode, using selected portion of the hardware circuit, the audio sample. The first computing system may transmit, via a particular communication protocol, encoded audio sample to the second computing system.

20 Claims, 9 Drawing Sheets

100

Downstream Audio Receiver (Listener)
102

Scene Analysis 106

- Device Characteristics
- User Characteristics
- Environmental Characteristics
- Number of Audio Sources
- Ranking of Audio Sources
- Relevance of Each Audio Source
- Dominant vs. Non-Dominant Audio Sources Scene Feedback
(e.g., indications of audio source(s), desired quality level per source, relevance score, device/user/environmental characteristics, etc.)

Encoded Audio Stream based on Scene Feedback

Upstream Audio Source (Sender)
104

Quality Modulation 108

- Activate/De-Activate Select Portions (e.g., Power Rails) on Hardware Circuit
- Reduce Number of Bits
- Transform Numeric Representations
- Reduce Quality at a Global Level
- Set Quality Threshold to Achieve a High-Level Goal

OPPORTUNISTIC QUALITY MODULATION USING SCENE FEEDBACK

TECHNICAL FIELD

This disclosure generally relates to adjusting data quality for transmission or playback on a computing device in a power and energy efficient manner.

BACKGROUND

A mobile computing device-such as a smartphone, a virtual reality (VR) device, an augmented reality (AR) device, a mixed reality device, a display tablet computer, or a laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, communication applications, music applications, or social-networking applications. With social-networking applications, users may connect, communicate, and share information with other users in their social networks. With communication applications, users may connect, communicate, and share information with each other.

Data communication between two computing or communication devices (e.g., AR/VR devices) generally include a considerable amount of network traffic. For example, two computing devices, including a sender's computing device and a receiver's computing device, that may be involved in a call may exchange several audio packets/samples. Quality of audio exchanged between the two computing devices may be of a low fidelity, medium fidelity, or high fidelity. Processing and sending high-fidelity audio may put a considerable amount of overhead on sender's computing device, especially during encoding of audio sample reflecting such high-fidelity audio. Also, sending the high-fidelity audio from the sender's computing device to the receiver's computing device is expensive from a transmission perspective. Sometimes high-fidelity audio or even medium-fidelity audio may not be needed at the receiver's device due to certain factors or limitations associated with the receiver's device. As an example, the speaker at the receiver's device may not be good and playing back the high-fidelity audio will not make a difference to the listener. As another example, the receiver's device may be located in a noisy environment and therefore playing the high-fidelity audio will not make much of a difference since it is not going to be heard very well. Having some sort of feedback from the receiver's device indicating, for example, device characteristics, information about different audio sources from where the audio is coming from, and relevance of each of these audio sources may help the sender's computing device to encode more efficiently saving processing power and transmission energy.

SUMMARY OF PARTICULAR EMBODIMENTS

Particular embodiments described herein relate to a technique for opportunistically or selectively performing quality modulation at a first computing system (e.g., upstream audio source) using scene feedback information received from a second computing system (e.g., downstream audio receiver). Specifically, the technique discussed herein enables the second computing system (e.g., downstream audio receiver) to send scene feedback information to the first computing system (e.g., upstream audio source). The scene feedback information may include, for example and without limitation, characteristics associated with the second computing system, information about one or more local or remote audio sources and the relative perceptibility of their fidelity based on factors including volume, direction, and distance, information about the local physical environment, and desired quality level for each of the one or more audio sources. Using the scene feedback information, the first computing system may make audio quality adjustments including one or more hardware adjustments in order to perform encoding of one or more audio samples in a power and energy efficient manner. Once the encoding is complete, the first computing system may send encoded sample(s) (e.g., low-fidelity audio of fewer bits) to the second computing system. The technique discussed herein reduces the transmission bits and reduces power needed to encode the audio. Also, when the second computing system decodes, it would also be cheaper to do so since there may be fewer bits to process by a decoder. In particular embodiments, the transmission of the scene feedback information and the encoded audio samples between the first and second computing systems may occur via gaps in a communication protocol, such as via gaps between Bluetooth packets.

Although, the present disclosure describes a particular technique for opportunistically performing quality modulation of audio samples based on scene feedback information, it should be noted that the technique discussed herein is not limited to the audio and other types of media (e.g., video) are possible and within the scope of the present disclosure. Stated differently and as an example, the technique can be applied to opportunistically/selectively perform quality modulation of video or video sample(s) based on scene feedback information.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system, and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or

DESCRIPTION OF EXAMPLE EMBODIMENTS

Figure 1:
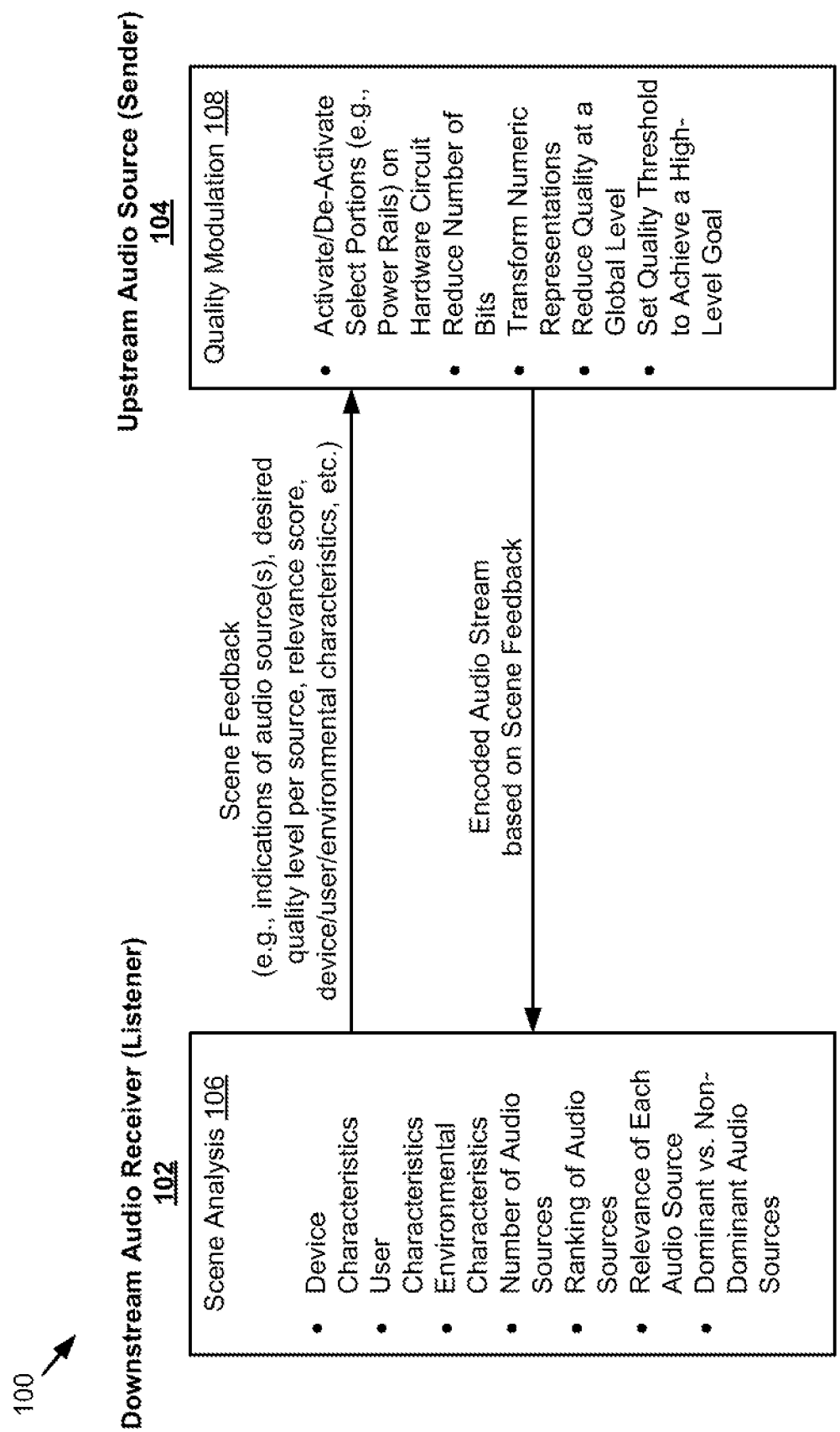
FIG. 1 illustrates an example block diagram showing essential components that may be involved in opportunistic quality modulation using scene feedback, in accordance with particular embodiments.

Data communication between two computing or communication devices (e.g., AR/VR headsets) generally include a considerable amount of network traffic. For example, two AR headsets that may be involved in a call may exchange a number of audio packets/samples. The hardware on each of these devices may encode the audio samples into an audio stream that may be exchanged between a first computing device (e.g., also interchangeably herein referred to as a sender's device) and a second computing device (e.g., also interchangeably herein referred to as a receiver's device). A decoder at either end may decode the received audio stream to play the audio. Quality of audio exchanged between the two devices may be of a low fidelity, medium fidelity, or high fidelity. Sometimes high-fidelity audio or even medium-fidelity audio may not be needed at the receiver's device due to certain factors or limitations associated with the receiver's device. As an example, the speaker at the receiver's device may not be good and playing back the high-fidelity audio will not make much difference to the listener. As another example, the receiver's device may be located in a noisy environment and therefore playing back the high-fidelity audio will not make much of a difference since it is not going to be heard very well. Having some sort of feedback from the receiver's device indicating, for example, device characteristics, information about different audio sources from where the audio is coming from, and relevance of each of these audio sources may help the sender's device to encode more efficiently saving processing power (e.g., during encoding) and transmission energy (e.g., during transmission of audio packets). For instance, if it is known in advance to the sender's device that high-fidelity audio is not needed at the receiver's side or that one particular audio source is dominant over the others, the sender's device may make certain adjustments during the encoding to modulate the quality of the audio to be transmitted. Such adjustments may put less load on the sender's components in doing the processing. Also, in making such adjustments, audio stream of reduced bits (e.g., corresponding to low fidelity) may be transmitted to the receiver's device such that it is computationally efficient for the receiver's device also at the time of decoding. Saving hardware resources during encoding and decoding especially becomes relevant for limited resources available on mobile or portable computing devices, such as AR/VR headsets.

Particular embodiments described herein relate to a technique for opportunistically or selectively performing quality modulation at the sender's side (also interchangeably herein referred to as upstream audio source) using scene feedback information received from the receiver's side (also interchangeably herein referred to as downstream audio receiver). Specifically, the technique discussed herein enables the downstream audio receiver (e.g., receiver's AR/VR device) to send scene feedback information to an encoder of the upstream audio source (e.g., associated with the sender's AR/VR device). Using the scene feedback information, the sender's device may make audio quality adjustments including one or more hardware adjustments in order to perform the encoding of one or more audio samples for transmission to the downstream audio receiver. In particular embodiments, the transmission of the scene feedback information and the encoded audio samples between the upstream audio source and the downstream audio receiver may occur via gaps in a communication protocol, such as via gaps between Bluetooth packets.

FIG. 1 illustrates an example block diagram 100 showing essential components that may be involved in opportunistic quality modulation using scene feedback, in accordance with particular embodiments. As depicted, the block diagram 100 includes a downstream audio receiver 102 (or listener 102) and an upstream audio source 104 (or sender 104). In particular embodiments, the upstream audio source 104 may be a source through which one or more audio and video samples may be transmitted to the downstream audio receiver 102. For instance, in a voice communication or calling scenario, an audio sample reflecting a person's voice may be transmitted from the upstream audio source 104 to the downstream audio receiver 102 and upon receipt may be played via a speaker at the receiver's end. In such a scenario, the upstream audio source 104 acts as a sender and the downstream audio receiver 102 acts as a listener. In one embodiment, the upstream audio source 104 discussed herein is a first communication device (e.g., first AR/VR device) and the downstream audio receiver 102 discussed herein is a second communication device (e.g., second AR/VR device).

Figure 3A:
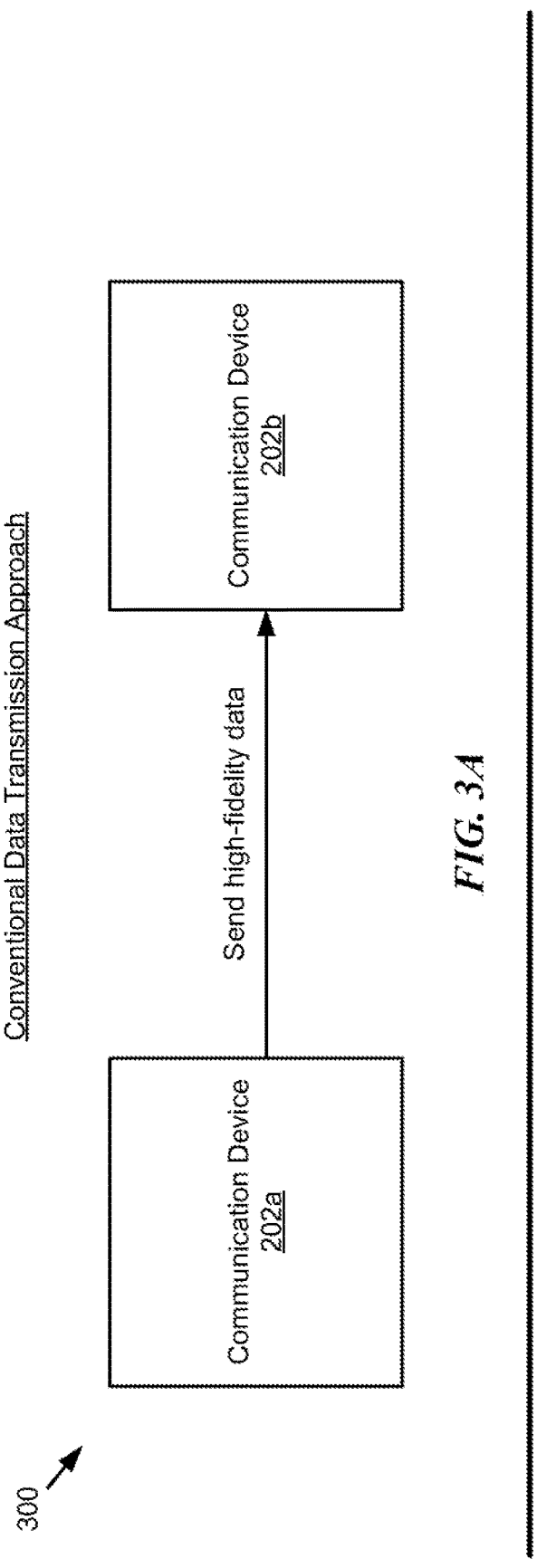
FIGS. 3A and 3B illustrate an example comparison between a conventional data transmission approach and an improved data transmission approach, in accordance with particular embodiments.

In a conventional scenario, such as one depicted in FIG. 3A, the upstream audio source 104 may send raw or uncompressed audio samples to the downstream audio receiver 102. For instance, the upstream audio source 104 may send high-fidelity audio to the receiver 102, as shown in FIG. 3A. Processing and sending high-fidelity audio may put a considerable amount of overhead on the sender 104 during encoding of audio sample reflecting such high-fidelity audio. Also sending the high-fidelity audio from the sender to the receiver is expensive from a transmission perspective. As discussed above, sometimes high-fidelity audio or even medium-fidelity audio may not be needed at the receiver's device due to certain factors or limitations associated with the receiver's device. Having some sort of feedback from the receiver 102 indicating a desired quality need for an audio source may help the upstream audio source or sender 104 to encode more efficiently saving processing power and transmission energy.

In particular embodiments, prior to the sender 104 encoding and sending an audio sample to the receiver 102, the sender 104 may receive scene feedback information from the receiver 102 instructing how one or more of its audio sources (e.g., person speaking, background music, a lion roaring, etc.) should be encoded at the sender's side. The downstream audio receiver 104 may be in the best position to dictate the ideal audio preferences for its associated user since it knows the current and future environmental context of the user (e.g., if the user is in a quiet room or a noisy restaurant) and/or the overall audio scene presented to the user (e.g., whether the user is simultaneously looking at an AR effect and making a virtual call).

The scene feedback information that is sent to the upstream audio source or sender 104 for encoding may be generated based on scene analysis 106 performed at the receiver 102. In particular embodiments, the scene analysis 106 may be performed by a scene analyzer, such as scene analyzer 206a or 206b (shown in FIG. 2). The scene analysis 106 may include, as an example, determining device characteristics, such as type of receiver's device, quality of speaker, frequency response of the receiver's device, etc. Determining the device characteristics may be important because if the device characteristics indicate that the speaker of the device is bad or the base response is low or the frequency response of the device is not up to the mark or at a desired quality threshold, then playing back high-fidelity audio on the device may not make much difference to the listener, and therefore this may be indicated to the upstream audio source 104 to encode an audio sample accordingly.

The scene analysis 106 may further include, as another example, determining characteristics of the user associated with the receiver's device. User characteristics may include, for example, determining whether the user has an impaired frequency response or problem in hearing. If that is the case, then there is no need for high-fidelity audio on the receiver's device as it may not be heard very well by the listener anyway and she may not be able to make out a difference. Therefore, this may be indicated to the upstream audio source 104 to encode an audio sample accordingly. In some embodiments, user characteristics may also include user preferences and/or history with respect to one or more audio sources. For instance, whether the user prefers one audio source (e.g., music coming from an app) over another (e.g., environmental sound).

The scene analysis 106 may further include, as another example, determining environmental characteristics i.e., characteristics of the environment in which the user is located. This may include determining whether the user is located in a quiet environment (e.g., sitting in an office) or in a noisy or crowded environment (e.g., sitting in a bus). Determining the environmental characteristics may be important because if the environment characteristics indicate that the user is located in a noisy environment, then playing high-fidelity audio on the device may not make much difference to the listener as it is not going to be heard very well, and therefore this may be indicated to the upstream audio source 104 to encode an audio sample accordingly. On the other hand, if the environmental characteristics indicate the user is located in a quiet environment, then the need for high-fidelity audio may make sense and this may be indicated to the source/sender 104 to encode accordingly.

The scene analysis 106 may further include, as another example, identifying a number of audio sources (e.g., local or remote audio sources) associated with the current context, scene, or environment of the user and the relative perceptibility of their fidelity based on factors, including volume, direction, and distance. For instance, all the different audio sources where the audio is coming from may be identified. By way of an example, the scene analyzer (e.g., 206a/206b) may identify 4 audio sources, including a first source corresponding to a music app that is playing a song in the background, a second source corresponding to a communication app for communicating with the upstream audio source/sender 104, a third source corresponding to external noise coming from the user's surrounding environment, and a fourth source corresponding to notifications that are received in the background.

Responsive to identifying the number of audio sources, these sources may be ranked as part of the scene analysis 106. The ranking of the various audio sources may be based on certain criteria. For instance, the scene analyzer may rank the audio sources based on one or more of the device, user, or environmental characteristics. By way of an example and not limitation, audio sources may be ranked based on user preferences or history of preferring one audio source over another. In this example, if the user has preferred receiving notifications and a particular music app, then the first source corresponding to the music app and the fourth source corresponding to the notifications may be ranked higher than the other sources. As another example, the audio sources may be ranked based on current context in which the user is involved in. In this example, if the user is currently involved in communication with the sender 104, then the second source corresponding to the communication app may be ranked highest among the other audio sources. In some embodiments, one or more artificial intelligence (AI) or machine-learning (ML) models may be trained to perform this ranking of audio sources. For instance, an AI or ML model may be trained to rank the different audio sources based on learning user behavior and actions with respect to these sources over a certain time period.

The scene analysis 106 may further include, as another example, determining a relevance and/or dominance of each identified audio source among the different audio sources. In one embodiment, the relevance and/or dominance of an audio source may be determined based on its ranking. For example, if the communication app through which the user is currently communicating with the sender 104 is ranked #1, then this audio source may be flagged as highly relevant and/or dominant audio source. Whereas, if the audio source corresponding to the external noise is ranked the lowest (e.g., rank 4 out of 4), then this audio source may be flagged as least relevant and/or a non-dominant audio source.

In some embodiments, the scene analyzer (e.g., 206a/206b) may assign a relevance score to each of the identified audio sources. For example, the scene analyzer may assign a relevance score between 0-10 to an audio source, where 0 indicates least relevant and 10 indicates highly relevant. In some embodiments, the scene analyzer may assign a label indicating a desired quality level to an audio source. For example, the scene analyzer may assign a high-fidelity level for an audio source corresponding to communication app through which the user is communicating with the sender 104, a medium-fidelity level for an audio source corresponding to music app playing song in the background, and low-fidelity levels for audio sources corresponding to external noise and notifications, respectively. As another example, the scene analyzer may assign low-fidelity levels to all audio sources based on the device characteristics indicating that the receiver's device has a poor speaker or frequency response, or based on the environmental characteristics indicating that the user is located in a noisy environment and there is no need for high-fidelity audio.

Response to completing the scene analysis 106, the downstream audio receiver 102 may send scene feedback information, generated as part of the scene analysis 106, to the upstream audio source or sender 104. In particular embodiments, the scene feedback information may include, for example and without limitation, information about one or more local or remote audio sources and the relative perceptibility of their fidelity based on factors including volume, direction, and distance, desired quality or fidelity level (e.g., low fidelity, medium fidelity, high fidelity) for each audio source, relevance score (e.g., 0-10) for each audio source, indications of dominant and non-dominant audio sources among the various audio sources, and various characteristics associated with the receiver's device, associated user, and its environment. In particular embodiments, the scene feedback information may be sent to the upstream audio source 104 via a particular communication medium or protocol (e.g., Bluetooth, Internet, Wi-Fi, cellular network, satellite communication, radio communication, infrared communication, etc.). In one embodiment, instructions specifying the quality per audio source may be sent upstream via gaps between data packets (e.g., Bluetooth codec packets) to allow this feature to be enabled without requiring any additional overhead or communication protocol.

In particular embodiments, the upstream audio source or sender 104 may use the scene feedback information received from the receiver 102 to modulate or adjust quality of an audio sample to be transmitted to the receiver 102. For instance, if the sender 104 and the receiver 102 are involved in a voice communication, then the quality of the audio sample representing user's voice associated with the sender's device 104 may be sent back according to the desired quality level (e.g., desired fidelity) specified by the receiver 102 in the scene feedback information. In particular embodiments, the quality modulation 108 of the audio sample may be performed by a quality modulator 208a/208b (individually or collectively herein referred to as 208) present at the sender 104.

In particular embodiments, the quality modulator 208 may perform the quality modulation 108 in cooperation or combination with the hardware on the upstream audio source 104. Based on the scene feedback received from the receiver 102, the quality modulator 208 may adjust quality of an audio sample and instruct the hardware to make one or more adjustments on the hardware (e.g., circuit) to encode the audio sample. As an example, based on the scene feedback information received from the receiver 102, the quality modulator 208 may adjust the quality of the audio sample by reducing the number of bits representing the sample from 32 bits to 16 bits. The quality modulator 208 may then instruct the hardware to encode the audio sample by using only 16-bit adder present on the hardware circuit and ignoring other portions of the adder (e.g., corresponding to 32 bits) on the circuit. The ignored portions of the adder in this way will not receive power, thereby making the encoding process power and energy efficient.

In some embodiments, the hardware circuit on the upstream audio source 104 (e.g., AR/VR device, such as device 604 or 700) may be designed in a way to take advantage of power saving. For example, the hardware circuit may be designed to have a first set of components corresponding to lower-order bits (e.g., 16 bits), a second set of components corresponding to medium-order bits (e.g., 32 bits), and a third set of components corresponding to higher-order bits (e.g., 64 bits), and one or more sets of components may be ignored or turned off to avoid unnecessary processing power and save energy. Stated differently, if 16-bit data is needed to be transmitted back to the receiver 102, then the quality modulator 208 may instruct the hardware to only enable or activate the first set of components corresponding to the 16 bits to encode the audio sample and de-activate other second and third sets of components (e.g., zero out components corresponding to 32 and 64 bits) on the circuit. As another example, the circuit may be designed to be able to selectively power down certain portions when they are not needed. For instance, the lower bits of a 32-bit floating-point representation could be made into zeros (less precision), and only the portion of the hardware that handles the higher-level bits would need to churn data and the rest won't be needed. The overall power needed in such a case would be lower. The system might also need to supply different power rails so that the circuit could choose a lower-powered power rail when not much power is needed, as discussed in further detail below.

In some embodiments, there may be different power rails on the hardware circuit. For instance, there be a first power rail corresponding to 4 bits that may be always powered on, a second power rail corresponding to 8 bits, a third power rail corresponding to 16 bits, and a fourth power rail corresponding to 32 bits. In order to encode an 8-bit sample, the quality modulator 208 may instruct the hardware to encode the sample by supplying voltage to just the second power rail corresponding to 8 bits and turning off voltage supply to other power rails (e.g., third and fourth power rails).

Another way to save power on the upstream audio source 104 is by transforming numeric representation of the audio sample from a first type to a second type. As an example, an audio sample to be transmitted may originally be represented as a 32-bit floating point number. Processing floating point numbers consumes higher energy. As such, the quality modulator may adjust quality of the audio sample by changing the 32-bit floating point number into a fixed-point number or integer. This allows the system to use only the fixed-point circuitry to process data. Encoding fixed-point or integer-type representations consumes relatively lower energy. The hardware circuit on the upstream audio source 104 may include floating point adders. All floating-point adders will have integer adders embedded inside of them. As such, to save energy, the quality modulator 208 may instruct the hardware to encode the audio sample by using only the integer adder portion of the floating-point adder, thereby saving on complexity and expense of floating-point calculations.

In some embodiments, the quality modulation 108 may include reducing quality at a global level or setting a quality threshold. For instance, the quality modulator 208, instead of sending specifying instructions to the hardware, may instruct the hardware to achieve a certain bitrate (e.g., 70% bitrate) or perform the encoding in a way to achieve a certain quality threshold, and the hardware may dynamically make adjustments to make this happen. For instance, the hardware may automatically adjust the bitrates being used or select certain circuits to turn off (e.g., bypass certain parts of the circuit) to achieve a higher-level goal.

Performing the quality modulation 108 at the upstream audio source or sender 104 is advantageous not only for the hardware of the sender's device, but also for the receiver 102. As an example, reducing the transmission bits (e.g., 32 bits to 16 bits) reduces power needed to encode the audio at the sender 104. Also, when the receiver 102 decodes, it would also be cheaper to do so if there are fewer bits to process.

In particular embodiments, responsive to performing the quality modulation 108 and the hardware encoding one or more audio samples, the sender 104 may send the encoded audio stream to the receiver or listener 102. A decoder at the receiver's side may decode the encoded audio stream and the decoded audio may then be played via a speaker of the receiver 102.

It should be noted that although scene analysis 106 and quality modulation 108 are shown as being performed on two different devices (e.g., sender and receiver), scene analysis 106 and quality modulation 108 can be performed on the same device for local playback of an audio sample on the device. For instance, a single device (e.g., either the upstream audio source 104 or the downstream audio receiver 102) may include both a scene analyzer for local analysis of a scene (e.g., device characteristics, environment characteristics, audio source(s), relevance of each audio source, etc.) and a quality modulator for locally adjusting quality of an audio sample for playback based on the local scene analysis, as shown and discussed in further detail below with respect to at least FIG. 5. One such embodiment of devices including both the scene analyzer and the quality modulator is shown in FIG. 2.

Figure 2:
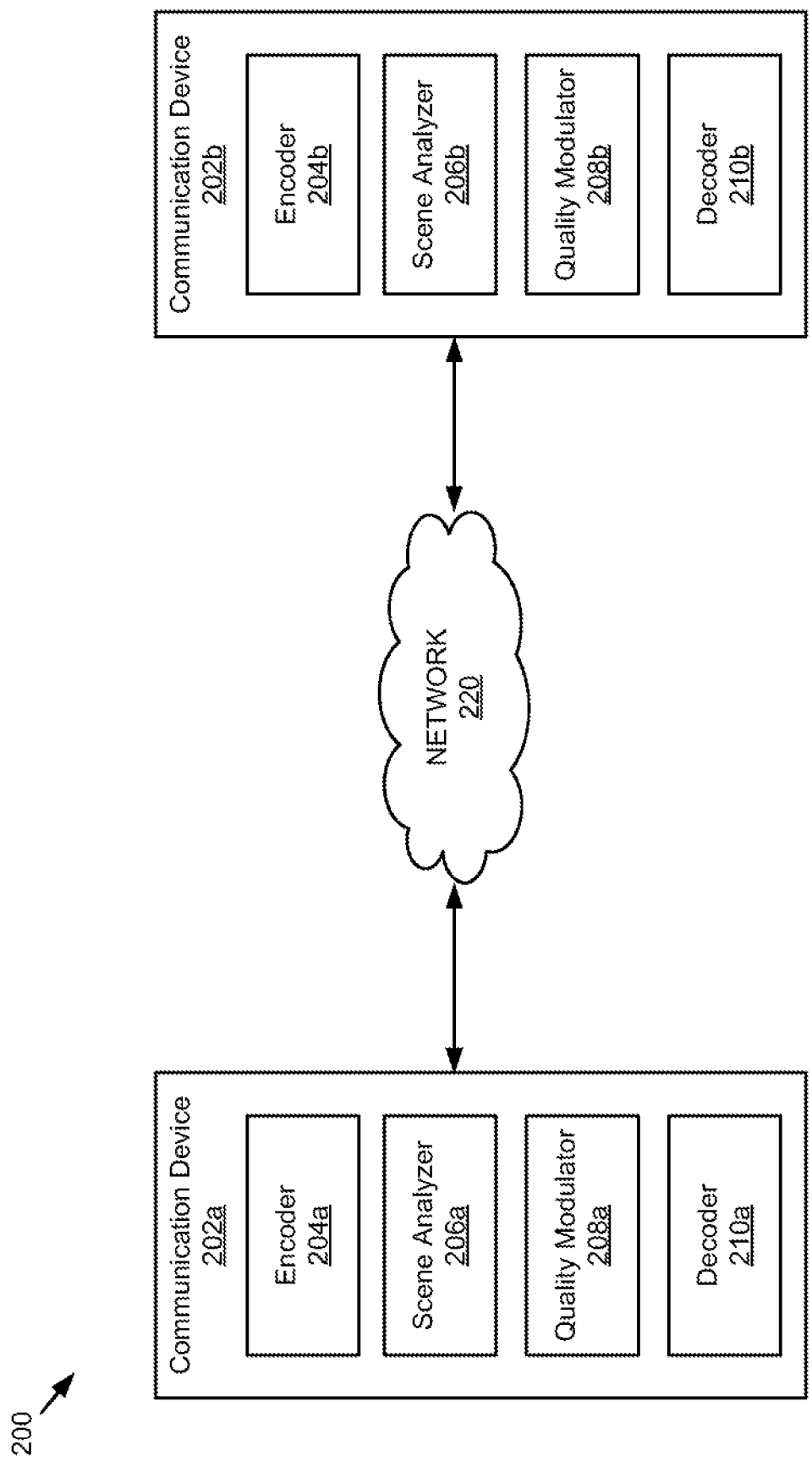
FIG. 2 illustrates an example environment associated with two communication devices that may be engaged in data communication with each other.

FIG. 2 illustrates an example environment 200 associated with two communication devices 202a and 202b that may be engaged in data communication with each other. For instance, the communication devices 202a and 202b may be artificial-reality devices, such as a virtual reality device (e.g., HMD 604 shown in FIG. 6) or an augmented reality device (e.g., AR frame 705 shown in FIG. 7). The two communication devices 202a and 202b may communicate with each other via a network 220 (e.g., Bluetooth, Internet, Wi-Fi, cellular network, satellite communication, radio communication, or infrared communication).

As depicted, each of the communication devices 202a and 202b may include an encoder 204a (or 204b), a decoder 210a (or 210b), a scene analyzer 206a (or 206b), and a quality modulator 208a (or 208b). Each of these components is now described with respect to the communication device 202a. However, it should be noted that the same description and functionality may apply to the components of the communication device 202b. The encoder 204a may be configured to encode one or more audio samples into an audio stream to be transmitted from one communication device to another via the network 220. The encoder 204a may work in close communication or cooperation with the hardware of the communication device 202a to encode the one or more audio samples in a power and energy efficient manner, as discussed above in reference to FIG. 1.

The decoder 210a may decode the data received from the other communication device 202b. For instance, when the communication device 202a is acting as an upstream audio source/sender (e.g., sender 104), the decoder 210a may decode the scene feedback information received from the other communication device 202b. In another instance, when the communication device 202a is acting as a downstream audio receiver (e.g., receiver 102), the decoder 210a may decode the encoded audio received from the other communication device 202b.

The scene analyzer 206a may perform scene analysis to determine one or more scene triggers or signals, as discussed, for example, in reference to FIG. 1. In particular embodiments, the scene analysis performed by the scene analyzer 206a may include, for example and without limitation, determining devices characteristics associated with the communication device 202a, determining user characteristics, determining environmental characteristics, identifying number of audio sources in a scene, ranking the number of audio sources, determining relevance of each source, determining dominant and non-dominant sources, etc., Based on the scene analysis, the scene analyzer 206a may generate scene feedback information to send to the other communication device 202b. The other communication device 202b may use the scene feedback information to perform quality modulation and encoding, as discussed elsewhere herein. In some embodiments, the scene analyzer 206a may use trained AI or ML models to perform its scene analysis.

The quality modulator 208 may adjust or modulate quality of an audio sample based on the scene feedback information received from the other communication device 202b. As an example, the quality modulator 208 may reduce a number of bits representing the audio sample (e.g., reduce 32 bits to 16 bits) and/or transform numeric representation of the audio sample from a first number representation (e.g., floating-point number) to a second number representation (e.g., fixed-point or integer number). Responsive to adjustment, the quality modulator 208 may instruct the hardware of the communication device 202a to select a portion of a hardware circuit (e.g., supply voltage to a particular power rail and ignore or turn off other power rails) on the computing device 202a for encoding the audio sample. The hardware may work together with the encoder 204a to encode the audio sample using the selected portion of the hardware circuit.

Each of the communication devices 202a and 202b may act as both an upstream audio source/sender and a downstream audio receiver. For example, in a first scenario, the communication device 202a may act as an upstream audio source or sender (e.g., sender 104) and the communication device 202b may act as a downstream audio receiver (e.g., receiver 102). In such first scenario, the communication device 202a may receive scene feedback information from the communication device 202b. The decoder 210a of the communication device 202a may decode the received scene feedback information. The quality modulator 208a may adjust or modulate an audio sample based on the scene feedback information and then instruct the encoder 204a to encode the audio sample using a subset of hardware components or a selected portion of a hardware circuit present on the communication device 202a. The encoder 204a may then send the encoded audio sample or stream to the communication device 202b via the network 220. Upon receiving the encoded audio sample, the decoder 210b of the communication device 202b may decode the encoded audio and the decoded audio may be played via a speaker of the communication device 202b.

In a second example scenario, the communication device 202b may act as an upstream audio source or sender (e.g., sender 104) and the communication device 202a may act as a downstream audio receiver (e.g., receiver 102). In such second scenario, the communication device 202b may receive scene feedback information from the communication device 202a. The decoder 210b of the communication device 202b may decode the received scene feedback information. The quality modulator 208b may adjust or modulate an audio sample based on the scene feedback information and then instruct the encoder 204b to encode the audio sample using a subset of hardware components or a selected portion of a hardware circuit present on the communication device 202*b*. The encoder 204*b* may then send the encoded audio sample or stream to the communication device 202*a* via the network 220. Upon receiving the encoded audio sample, the decoder 210*a* of the communication device 202*a* may decode the encoded audio and the decoded audio may be played via a speaker of the communication device 202*a*.

Figure 3B:
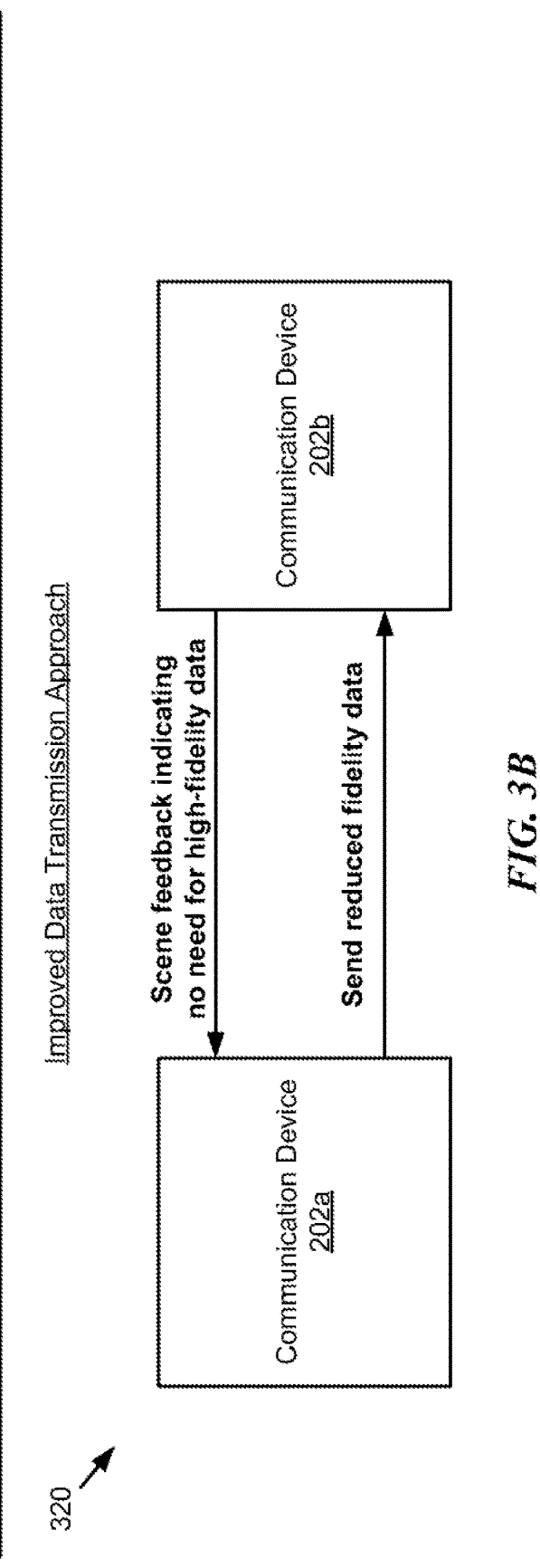

FIGS. 3A and 3B illustrate an example comparison between a conventional data transmission approach 300 (e.g., prior to quality modulation using scene feedback discussed herein) and an improved data transmission approach 320, in accordance with particular embodiments.

Specifically, FIG. 3A illustrates an example conventional data transmission approach 300 for sending data from a first communication device 202*a* to a second communication device 202*b*. In the conventional approach 300, the first communication device 202*a* (e.g., upstream audio source or sender 104) may send raw, uncompressed, or high fidelity compressed audio samples to the second communication device 202*b* (e.g., downstream audio receiver 102). For instance, the first communication device 202*a* may send high-fidelity audio to the second communication device 202*b*. Processing and sending high-fidelity audio may put a considerable amount of overhead on the first communication device 202*a* during encoding of audio sample reflecting such high-fidelity audio. Also, processing such high-fidelity audio may be computationally expensive at the second communication device 202*b* during decoding. As discussed elsewhere herein, sometimes high-fidelity audio or even medium-fidelity audio may not be needed at the receiver's device (i.e., second communication device 202*b*) due to certain factors or limitations associated with the device. Having some sort of feedback from the second communication device 202*b* indicating a desired quality level for an audio source may help the first communication device 202*a* to encode more efficiently saving processing power and transmission energy.

FIG. 3B illustrates an example improved data transmission approach 320 that is power and energy efficient, in accordance with particular embodiments. As discussed elsewhere herein, prior to the first communication device 202*a* sending data to the second communication device 202*b*, the first communication device 202*a* may receive scene feedback information from the second communication device 202*b* indicating a desired quality level or need of fidelity for an audio. In the scenario 320 depicted in FIG. 3B, the scene feedback information indicates that there is no need for high-fidelity data. Accordingly, quality of an audio sample for transmission to the second communication device 202*b* may be reduced (e.g., 32 bits to 8 bits) and the encoder on the first communication device 202*a* may encode the audio sample using low-powered rail or hardware components corresponding to the reduced quality, thereby saving processing power and energy. Once the encoding is complete, the first communication device 202*a* may send reduced fidelity data (e.g., low-fidelity audio) of fewer bits to the second communication device 202*b*. The improved data transmission approach 320 discussed herein reduces the transmission bits and reduces power needed to encode the audio. Also, when the second communication device 202*b* decodes, it would also be cheaper to do so since there are fewer bits.

Figure 4:
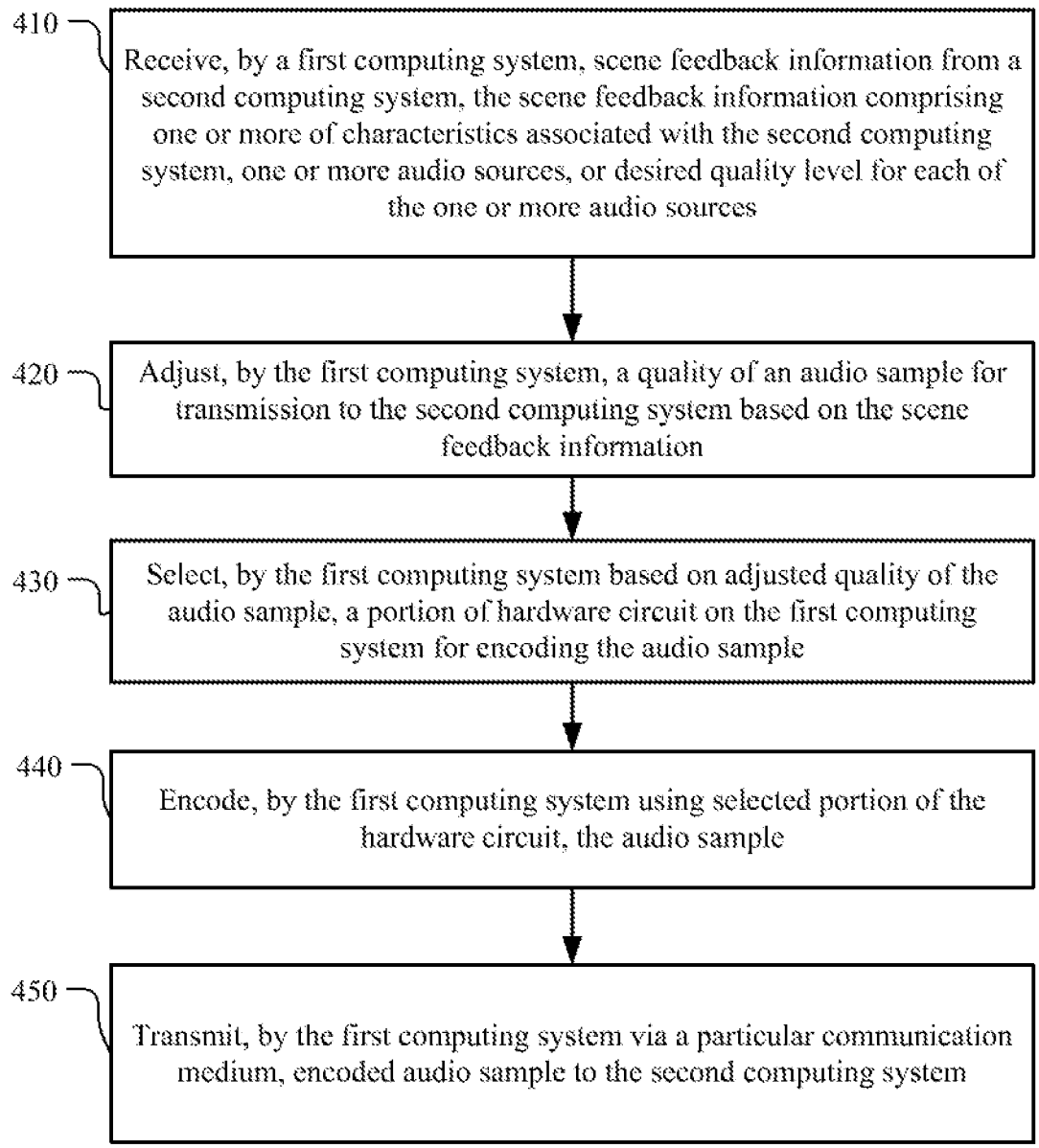
FIG. 4 illustrates an example method for adjusting a quality of an audio sample for transmission to a computing system based on scene feedback information, in accordance with particular embodiments.

FIG. 4 illustrates an example method 400 for adjusting a quality of an audio sample for transmission to a computing system based on scene feedback information, in accordance with particular embodiments. The method 400 may begin at step 410, where a first computing system (e.g., upstream audio source or sender 104) may receive scene feedback information from a second computing system (e.g., downstream audio receiver or listener 102). The first and second computing systems may be artificial or augmented reality systems and may be engaged in augmented calling or augmented reality (AR) calling (e.g., two users wearing augmented reality headsets and talking to each other, where one or more virtual objects are overlaid on top of their surrounding real-world or physical environment). The scene feedback information may include, for example and without limitation, characteristics associated with the second computing system, one or more audio sources, and desired quality level for each of the one or more audio sources. The desired quality level may be one of a high fidelity, a medium fidelity, or a low fidelity.

At step 420, the first computing system may adjust quality of an audio sample for transmission to the second computing system based on the scene feedback information. In particular embodiments, adjusting the quality of the audio sample may include one or more of reducing a number of bits representing the audio sample (e.g., reducing 32 bits to 16 bits) or transforming numeric representation of the audio sample from a first number representation (e.g., floating-point representation) to a second number representation (e.g., fixed-point representation or integer). In one embodiment, transforming the numeric representation may include changing from a floating-point representation to a fixed-point representation or an integer-type representation. In another embodiment, transforming the numeric representation may include changing from a first floating point format (e.g., 32 bit) to a second floating point format (e.g., 16 bit).

At step 430, the first computing system may select, based on adjusted quality of the audio sample, a portion of hardware circuit on the first computing system for encoding the audio sample. In some embodiments, the hardware circuit may include a plurality of power rails corresponding to different power and quality requirements (e.g., first power rail corresponding to 8 bits, second power rail corresponding to 16 bits, third power rail corresponding to 32 bits, etc.), and selecting the portion of the hardware circuit may include activating a particular power rail from the plurality of power rails that corresponds to the reduced number of bits or the second number representation (e.g., fixed-point representation or a integer-type representation) and deactivating other power rails in the plurality of power rails that correspond to higher order bits or the first number representation (e.g., floating-point representation).

At step 440, the first computing system may encode, using selected portion of the hardware circuit, the audio sample. At step 450, the first computing system may transmit, via a particular communication medium or protocol, encoded audio sample to the second computing system. In particular embodiments, the particular communication medium or protocol may be one of Bluetooth, Internet, Wi-Fi, cellular network, satellite communication protocol, radio communication protocol, or infrared communication protocol. The encoded audio sample may be transmitted via gaps between various data packets on the particular communication protocol.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for adjusting a quality of an audio sample for transmission to a computing system based on scene feedback information, including the particular steps of the method of FIG. 4, this disclosure contemplates any suitable method for adjusting a quality of an audio sample for transmission to a computing system based on scene feedback information, including any suitable steps, which may include a subset of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
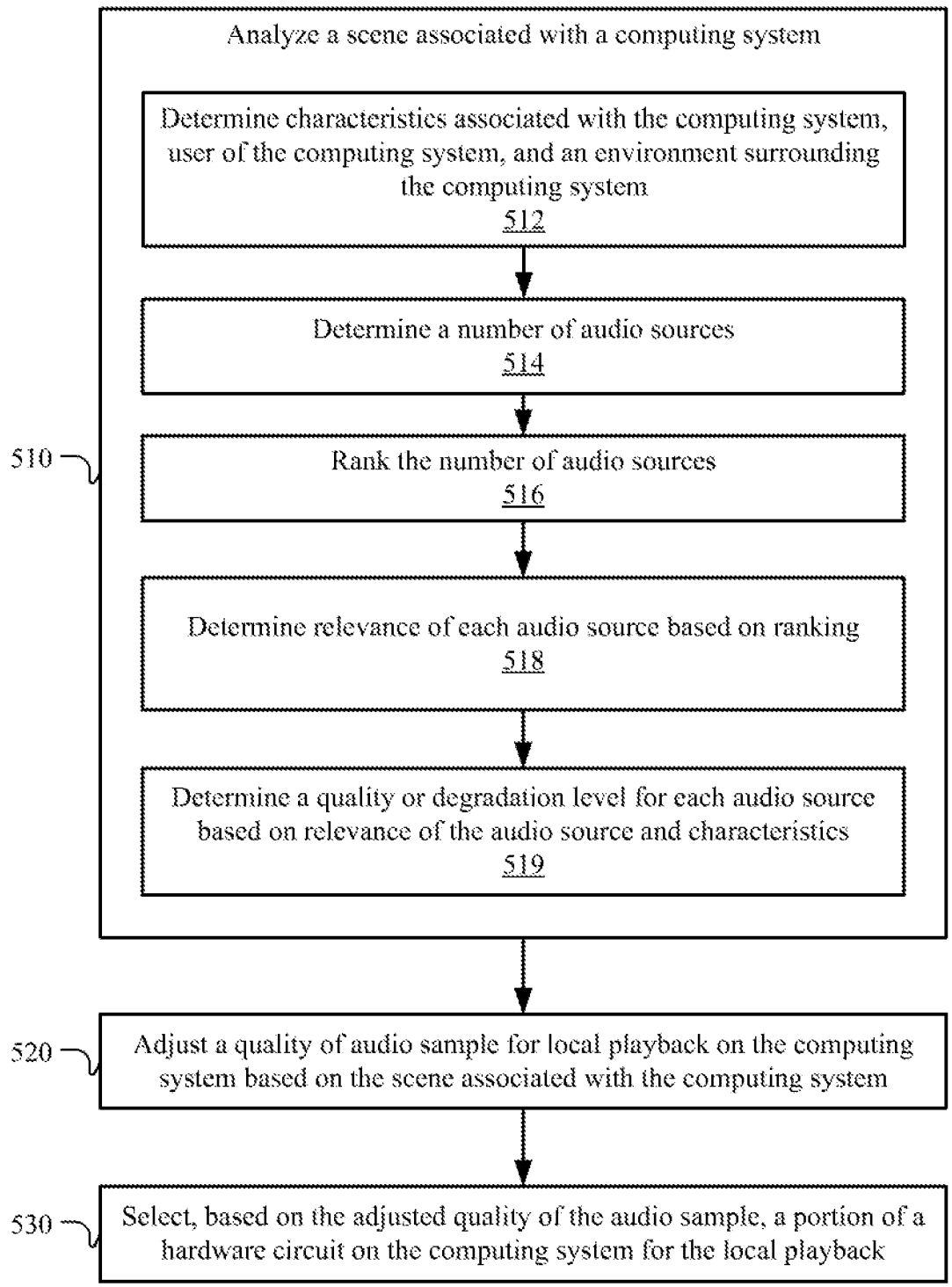
FIG. 5 illustrates an example method for adjusting a quality of an audio sample for local playback on a computing system, in accordance with particular embodiments.

FIG. 5 illustrates an example method 500 for adjusting a quality of an audio sample for local playback on a computing system, in accordance with particular embodiments. The method may begin at step 510, where the computing system may analyze a scene associated with the computing system. The computing system may be one of an upstream audio source (e.g., source or sender 104) or a downstream audio receiver (e.g., receiver or listener 102). In particular embodiments, the computing system may analyze the scene as a series of steps, as discussed, for example, in reference to at least FIG. 1. For instance, in a first step 512, the computing system may determine characteristics associated with the computing system, user of the computing system, and an environment surrounding the computing system. In a second step 514, the computing system may determine a number of audio sources. The audio sources may be associated with the computing system and/or another computing system. In a third step 516, the computing system may rank the audio sources based on certain criteria (e.g., device characteristics, user characteristics, environmental characteristics, etc.). In a fourth step 518, the computing system may determine relevance of each audio source based on the ranking. In a fifth step 519, the computing system may determine a quality or degradation level for each of the audio sources based on the relevance of the audio source and the various characteristics (e.g., device characteristics, user characteristics, environmental characteristics, etc.).

At step 520, the computing system may adjust the quality of an audio sample for local playback on the first computing system based on the scene associated with the computing system. At step 530, the computing system may select, based on the adjusted quality of the audio sample, a portion of a hardware circuit on the computing system for the local playback. In some embodiments, playing the audio locally on the computing system in such a way is power efficient as it avoids the need of using unnecessary or additional hardware resources that may not be needed based on the current scene or context associated with the computing system.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for adjusting a quality of an audio sample for local playback on a computing system, including the particular steps of the method of FIG. 5, this disclosure contemplates any suitable method for adjusting a quality of an audio sample for local playback on a computing system, including any suitable steps, which may include a subset of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Example Computing Systems or Communication Devices

Figure 6:
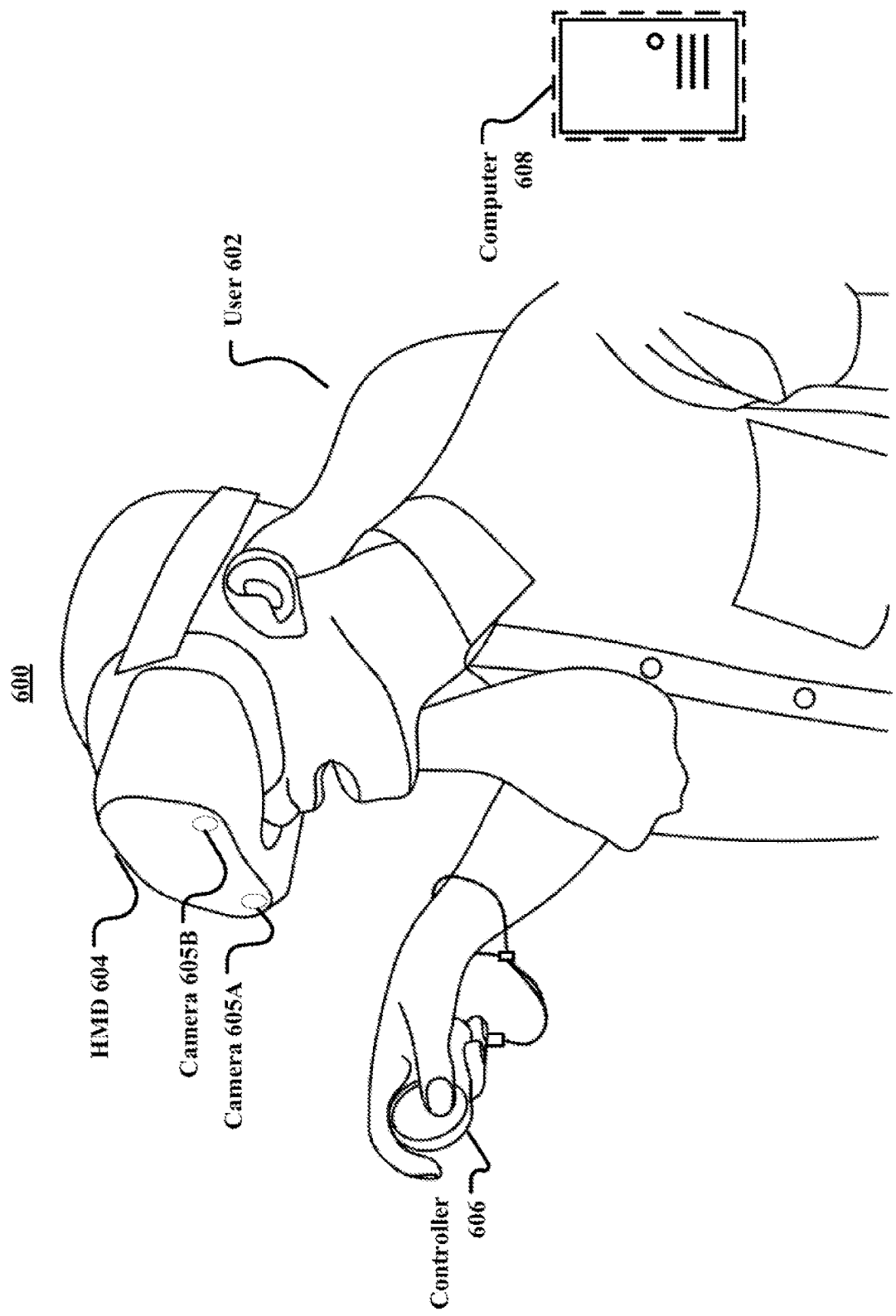
FIG. 6 illustrates an example of a computing system (or a communication device).

FIG. 6 illustrates an example of a computing system 600 (or a communication device 600). The computing system 600 may be worn by a user 602. The computing system 600 may be used to implement some of the embodiments/examples disclosed herein. The computing system 600 may be configured to operate as a virtual reality display, an augmented reality display, and/or a mixed reality display. In particular embodiments, the computing system 600 may comprise a head-mounted device ("HMD") 604, a controller 606, and a computer 608. The HMD 604 may be worn over the user's eyes and provide visual content to the user 602 through internal displays (not shown). The HMD 604 may have two separate internal displays, one for each eye of the user 602. As illustrated in FIG. 6, the HMD 604 may completely cover the user's field of view. By being the exclusive provider of visual information to the user 602, the HMD 604 achieves the goal of providing an immersive artificial-reality experience. In some embodiments, the user 602 may use the HMD 604 to engage in an augmented calling with another user wearing another HMD or another type of AR/VR device, such as the computing system 700.

The HMD 604 may have external-facing cameras, such as the two forward-facing cameras 605A and 605B shown in FIG. 6. While only two forward-facing cameras 605A-B are shown, the HMD 604 may have any number of cameras facing any direction (e.g., an upward-facing camera to capture the ceiling or room lighting, a downward-facing camera to capture a portion of the user's face and/or body, a backward-facing camera to capture a portion of what's behind the user, and/or an internal camera for capturing the user's eye gaze for eye-tracking purposes). The external-facing cameras are configured to capture the physical environment around the user and may do so continuously to generate a sequence of frames (e.g., as a video).

In some embodiments, the HMD 604 may further include a loudspeaker or an earpiece (not shown) for playing an audio to the user 602 wearing the HMD 604.

The 3D representation may be generated based on depth measurements of physical objects observed by the cameras 605A-B. Depth may be measured in a variety of ways. In particular embodiments, depth may be computed based on stereo images. For example, the two forward-facing cameras 605A-B may share an overlapping field of view and be configured to capture images simultaneously. As a result, the same physical object may be captured by both cameras 605A-B at the same time. For example, a particular feature of an object may appear at one pixel $P_A$ in the image captured by camera 605A, and the same feature may appear at another pixel $p_B$ in the image captured by camera 605B. As long as the depth measurement system knows that the two pixels correspond to the same feature, it could use triangulation techniques to compute the depth of the observed feature. For example, based on the camera 605A's position within a 3D space and the pixel location of $P_A$ relative to the camera 605A's field of view, a line could be projected from the camera 605A and through the pixel $P_A$. A similar line could be projected from the other camera 605B and through the pixel $p_B$. Since both pixels are supposed to correspond to the same physical feature, the two lines should intersect. The two intersecting lines and an imaginary line drawn between the two cameras 605A and 605B form a triangle, which could be used to compute the distance of the observed feature from either camera 605A or 605B or a point in space where the observed feature is located.

In particular embodiments, the pose (e.g., position and orientation) of the HMD 604 within the environment may be needed. For example, in order to render the appropriate display for the user 602 while he is moving about in a virtual environment, the system 600 would need to determine his position and orientation at any moment. Based on the pose of the HMD, the system 600 may further determine the viewpoint of either of the cameras 605A and 605B or either of the user's eyes. In particular embodiments, the HMID 604 may be equipped with inertial-measurement units ("IMU"). The data generated by the IMU, along with the stereo imagery captured by the external-facing cameras 605A-B, allow the system 600 to compute the pose of the HMD 604 using, for example, SLAM (simultaneous localization and mapping) or other suitable techniques.

In particular embodiments, the computing system 600 may further have one or more controllers 606 that enable the user 602 to provide inputs. The controller 606 may communicate with the HMD 604 or a separate computer 608 via a wireless or wired connection. The controller 606 may have any number of buttons or other mechanical input mechanisms. In addition, the controller 606 may have an IMU so that the position of the controller 606 may be tracked. The controller 606 may further be tracked based on predetermined patterns on the controller. For example, the controller 606 may have several infrared LEDs or other known observable features that collectively form a predetermined pattern. Using a sensor or camera, the system 600 may be able to capture an image of the predetermined pattern on the controller. Based on the observed orientation of those patterns, the system may compute the controller's position and orientation relative to the sensor or camera.

The computing system 600 may further include a computer unit 608. The computer unit may be a stand-alone unit that is physically separate from the HMD 604 or it may be integrated with the HMD 604. In embodiments where the computer 608 is a separate unit, it may be communicatively coupled to the HMD 604 via a wireless or wired link. The computer 608 may be a high-performance device, such as a desktop or laptop, or a resource-limited device, such as a mobile phone. A high-performance device may have a dedicated GPU and a high-capacity or constant power source. A resource-limited device, on the other hand, may not have a GPU and may have limited battery capacity. As such, the algorithms that could be practically used by a computing system 600 depends on the capabilities of its computer unit 608.

Figure 7:
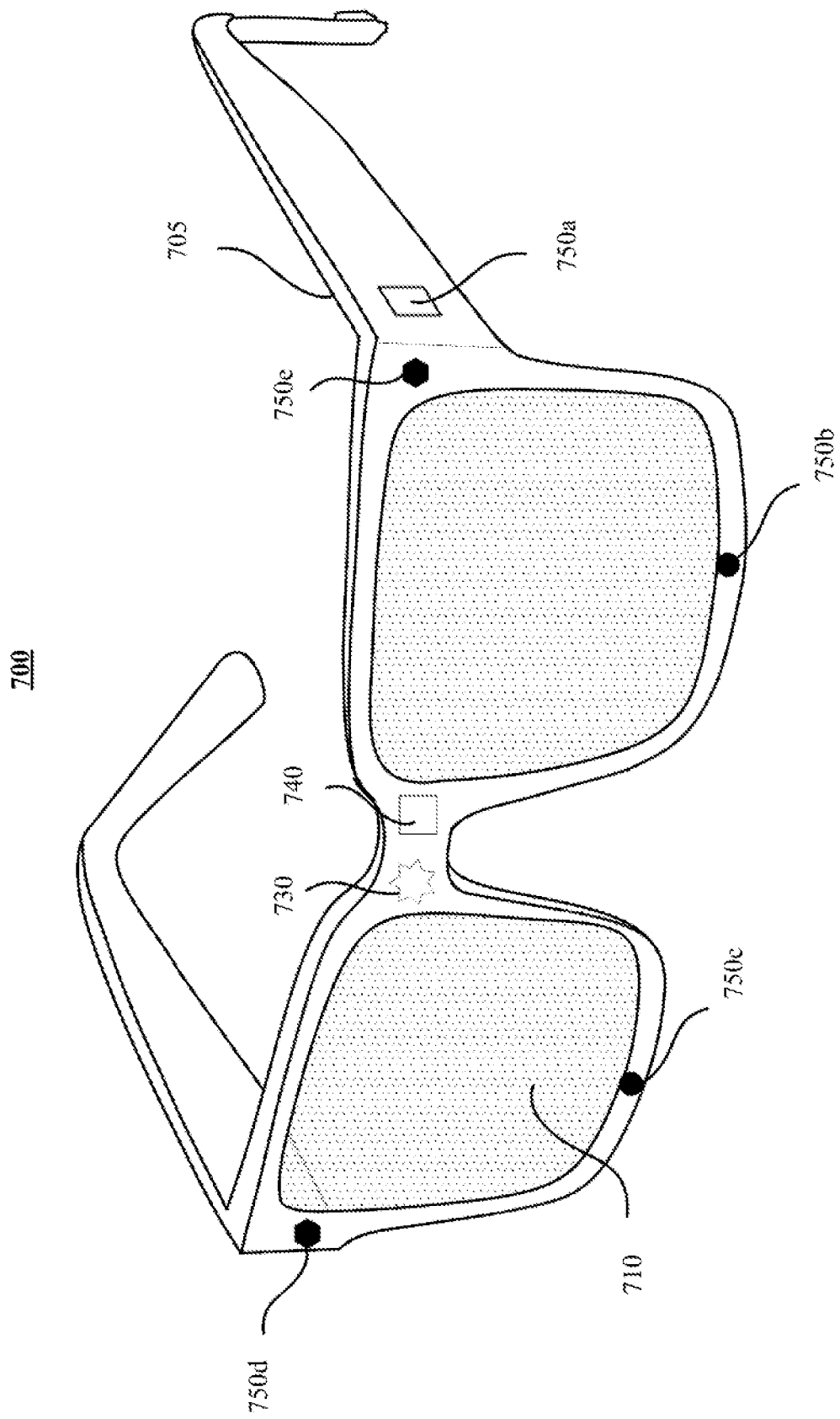
FIG. 7 illustrates another example computing system (or a communication device).

FIG. 7 illustrates another example computing system 700 (or a communication device 700) that can be worn by a user. Specifically, FIG. 7 is a perspective view of an example of a near-eye display system 700 in the form of a pair of glasses for implementing some of the embodiments/examples disclosed herein. The computing system 700 may be configured to operate as a virtual reality display, an augmented reality display, and/or a mixed reality display. In some embodiments, a user wearing the computing system 700 may use it to engage in an augmented calling with another user wearing similar type of computing system 700 or another type of AR/VR device, such as the HMD 604. The computing system 700 may include a frame 705 and a display 710. Display 710 may be configured to present content to a user. In some embodiments, display 710 may include display electronics and/or display optics. For example, display 710 may include an LCD display panel, an LED display panel, or an optical display panel (e.g., a waveguide display assembly).

The computing system 700 may further include various sensors 750a, 750b, 750c, 750d, and 750e on or within frame 705. In some embodiments, sensors 750a-750e may include one or more depth sensors, motion sensors, position sensors, inertial sensors, or ambient light sensors. In some embodiments, sensors 750a-750e may include one or more image sensors configured to generate image data representing different fields of views in different directions. In some embodiments, sensors 750a-750e may be used as input devices to control or influence the displayed content of computing system 700, and/or to provide an interactive VR/AR/MR experience to a user of computing system 700. In some embodiments, sensors 750a-750e may also be used for stereoscopic imaging.

In some embodiments, the computing system 700 may further include one or more illuminators 730 to project light into the physical environment. The projected light may be associated with different frequency bands (e.g., visible light, infra-red light, ultra-violet light, etc.), and may serve various purposes. For example, illuminator(s) 730 may project light in a dark environment (or in an environment with low intensity of infra-red light, ultra-violet light, etc.) to assist sensors 750a-750e in capturing images of different objects within the dark environment. In some embodiments, illuminator(s) 730 may be used to project certain light patterns onto the objects within the environment.

In some embodiments, computing system 700 may also include a high-resolution camera 740. Camera 740 may capture images of the physical environment in the field of view. The captured images may be processed, for example, by a virtual reality engine to add virtual objects to the captured images or modify physical objects in the captured images, and the processed images may be displayed to the user by display 710 for AR or MR applications. In some embodiments, the computing system 700 may also include a loudspeaker or an earpiece (not shown) for playing an audio to the user wearing the computing system 700.

Example Network Environment

Figure 8:
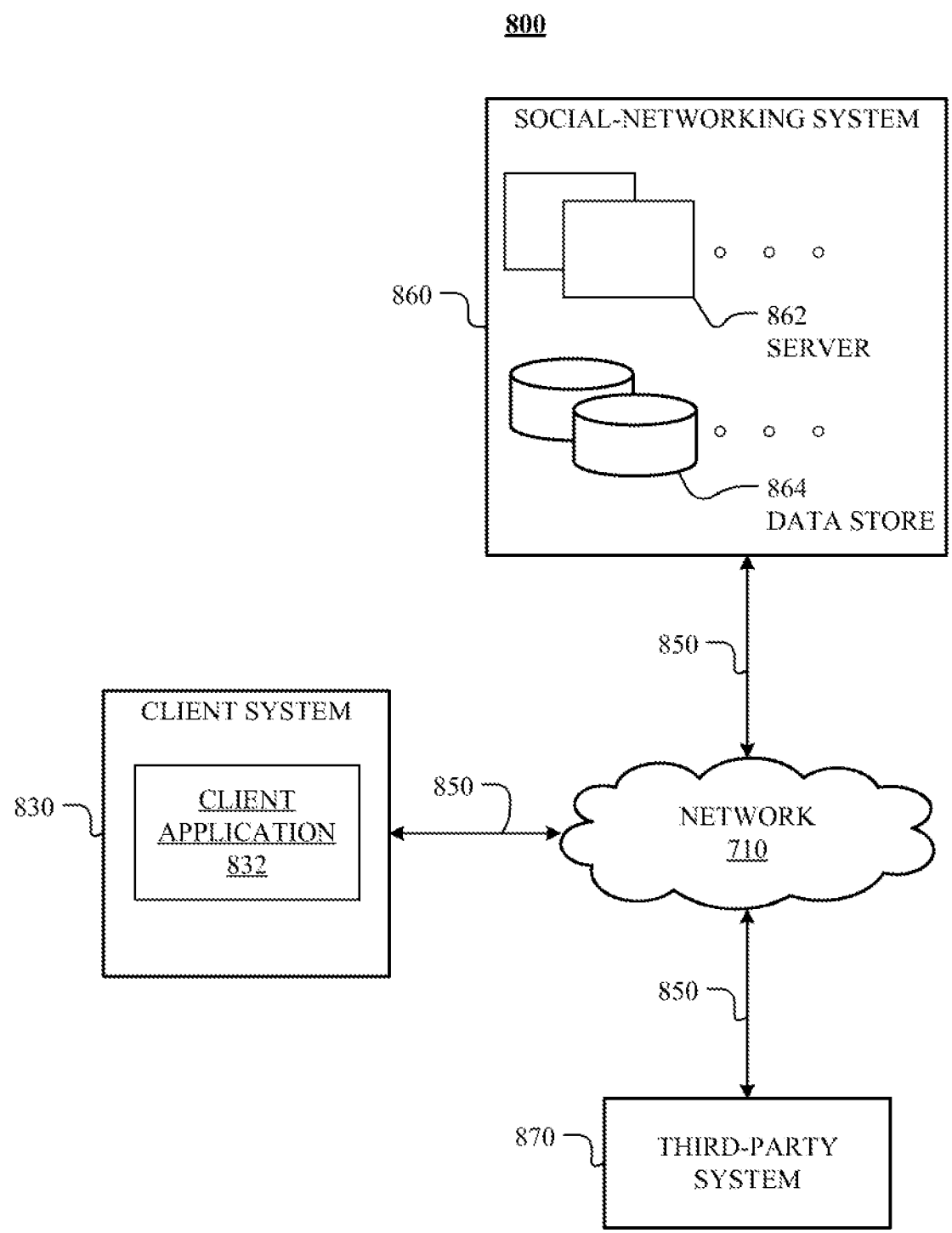
FIG. 8 illustrates an example network environment associated with a social-networking system.

FIG. 8 illustrates an example network environment 800 associated with a social-networking system. Network environment 800 includes a client system 830, a social-networking system 860, and a third-party system 870 connected to each other by a network 810. Although FIG. 8 illustrates a particular arrangement of client system 830, social-networking system 860, third-party system 870, and network 810, this disclosure contemplates any suitable arrangement of client system 830, social-networking system 860, third-party system 870, and network 810. As an example and not by way of limitation, two or more of client system 830, social-networking system 860, and third-party system 870 may be connected to each other directly, bypassing network 810. As another example, two or more of client system 830, social-networking system 860, and third-party system 870 may be physically or logically co-located with each other in whole or in part. Moreover, although FIG. 8 illustrates a particular number of client systems 830, social-networking systems 860, third-party systems 870, and networks 810, this disclosure contemplates any suitable number of client systems 830, social-networking systems 860, third-party systems 870, and networks 810. As an example and not by way of limitation, network environment 800 may include multiple client systems 830, social-networking systems 860, third-party systems 870, and networks 810.

This disclosure contemplates any suitable network 810. As an example and not by way of limitation, one or more portions of network 810 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 810 may include one or more networks 810.

Links 850 may connect client system 830, social-networking system 860, and third-party system 870 to communication network 810 or to each other. This disclosure contemplates any suitable links 850. In particular embodiments, one or more links 850 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 850 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 850, or a combination of two or more such links 850. Links 850 need not necessarily be the same throughout network environment 800. One or more first links 850 may differ in one or more respects from one or more second links 850.

In particular embodiments, client system 830 may be an electronic device including hardware, software, or embedded logic components or a combination of two or more such components and capable of carrying out the appropriate functionalities implemented or supported by client system 830. As an example and not by way of limitation, a client system 830 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 830. A client system 830 may enable a network user at client system 830 to access network 810. A client system 830 may enable its user to communicate with other users at other client systems 830.

In particular embodiments, client system 830 may include a client application 832 operable to provide various computing functionalities, services, and/or resources, and to send data to and receive data from the other entities of the network 810, such as the social-networking system 860 and/or the third-party system 870. For example, the client application 832 may be a social-networking application, an artificial-intelligence related application, a virtual reality application, an augmented reality application, an artificial reality or a mixed reality application, a camera application, a messaging application for messaging with users of a messaging network/system, a gaming application, an internet searching application, etc.

In particular embodiments, the client application 832 may be storable in a memory and executable by a processor of the client system 830 to render user interfaces, receive user input, send data to and receive data from one or more of the social-networking system 860 and the third-party system 870. The client application 832 may generate and present user interfaces to a user via a display of the client system 830.

In particular embodiments, social-networking system 860 may be a network-addressable computing system that can host an online social network, a virtual reality environment, or an augmented reality environment. Social-networking system 860 may generate, store, receive, and send social-networking data, such as, for example, user-profile data, concept-profile data, social-graph information, or other suitable data related to the online social network. Social-networking system 860 may be accessed by the other components of network environment 800 either directly or via network 810. As an example and not by way of limitation, client system 830 may access social-networking system 860 using a web browser, or a native application associated with social-networking system 860 (e.g., a mobile social-networking application, a messaging application, another suitable application, or any combination thereof) either directly or via network 810. In particular embodiments, social-networking system 860 may include one or more servers 862. Each server 862 may be a unitary server or a distributed server spanning multiple computers or multiple datacenters. Servers 862 may be of various types, such as, for example and without limitation, a mapping server, web server, news server, mail server, message server, advertising server, file server, application server, exchange server, database server, proxy server, another server suitable for performing functions or processes described herein, or any combination thereof. In particular embodiments, each server 862 may include hardware, software, or embedded logic components or a combination of two or more such components for carrying out the appropriate functionalities implemented or supported by server 862. In particular embodiments, social-networking system 860 may include one or more data stores 864. Data stores 864 may be used to store various types of information. In particular embodiments, the information stored in data stores 864 may be organized according to specific data structures. In particular embodiments, each data store 864 may be a relational, columnar, correlation, or other suitable database. Although this disclosure describes or illustrates particular types of databases, this disclosure contemplates any suitable types of databases. Particular embodiments may provide interfaces that enable a client system 830, a social-networking system 860, or a third-party system 870 to manage, retrieve, modify, add, or delete, the information stored in data store 864.

In particular embodiments, social-networking system 860 may store one or more social graphs in one or more data stores 864. In particular embodiments, a social graph may include multiple nodes-which may include multiple user nodes (each corresponding to a particular user) or multiple concept nodes (each corresponding to a particular concept)—and multiple edges connecting the nodes. Social-networking system 860 may provide users of the online social network the ability to communicate and interact with other users. In particular embodiments, users may join the online social network via social-networking system 860 and then add connections (e.g., relationships) to a number of other users of social-networking system 860 to whom they want to be connected. Herein, the term "friend" may refer to any other user of social-networking system 860 with whom a user has formed a connection, association, or relationship via social-networking system 860.

In particular embodiments, social-networking system 860 may provide users with the ability to take actions on various types of items or objects, supported by social-networking system 860. As an example and not by way of limitation, the items and objects may include groups or social networks to which users of social-networking system 860 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 860 or by an external system of third-party system 870, which is separate from social-networking system 860 and coupled to social-networking system 860 via a network 810.

In particular embodiments, social-networking system 860 may be capable of linking a variety of entities. As an example and not by way of limitation, social-networking system 860 may enable users to interact with each other as well as receive content from third-party systems 870 or other entities, or to allow users to interact with these entities through an application programming interfaces (API) or other communication channels.

In particular embodiments, a third-party system 870 may include one or more types of servers, one or more data stores, one or more interfaces, including but not limited to APIs, one or more web services, one or more content sources, one or more networks, or any other suitable components, e.g., that servers may communicate with. A third-party system 870 may be operated by a different entity from an entity operating social-networking system 860. In particular embodiments, however, social-networking system 860 and third-party systems 870 may operate in conjunction with each other to provide social-networking services to users of social-networking system 860 or third-party systems 870. In this sense, social-networking system 860 may provide a platform, or backbone, which other systems, such as third-party systems 870, may use to provide social-networking services and functionality to users across the Internet.

In particular embodiments, a third-party system 870 may include a third-party content object provider. A third-party content object provider may include one or more sources of content objects, which may be communicated to a client system 830. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 860 also includes user-generated content objects, which may enhance a user's interactions with social-networking system 860. User-generated content may include anything a user can add, upload, send, or "post" to social-networking system 860. As an example and not by way of limitation, a user communicates posts to social-networking system 860 from a client system 830. Posts may include data such as status updates or other textual data, location information, photos, videos, links, music or other similar data or media. Content may also be added to social-networking system 860 by a third-party through a "communication channel," such as a newsfeed or stream.

In particular embodiments, social-networking system 860 may include a variety of servers, sub-systems, programs, modules, logs, and data stores. In particular embodiments, social-networking system 860 may include one or more of the following: a web server, a mapping server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 860 may also include suitable components such as network interfaces, security mechanisms, load balancers, failover servers, management-and-network-operations consoles, other suitable components, or any suitable combination thereof. In particular embodiments, social-networking system 860 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 860 to one or more client systems 830 or one or more third-party system 870 via network 810. The web server may include a mail server or other messaging functionality for receiving and routing messages between social-networking system 860 and one or more client systems 830. An API-request server may allow a third-party system 870 to access information from social-networking system 860 by calling one or more APIs. An action logger may be used to receive communications from a web server about a user's actions on or off social-networking system 860. In conjunction with the action log, a third-party-content-object log may be maintained of user exposures to third-party-content objects. A notification controller may provide information regarding content objects to a client system 830. Information may be pushed to a client system 830 as notifications, or information may be pulled from client system 830 responsive to a request received from client system 830. Authorization servers may be used to enforce one or more privacy settings of the users of social-networking system 860. A privacy setting of a user determines how particular information associated with a user can be shared. The authorization server may allow users to opt in to or opt out of having their actions logged by social-networking system 860 or shared with other systems (e.g., third-party system 870), such as, for example, by setting appropriate privacy settings. Third-party-content-object stores may be used to store content objects received from third parties, such as a third-party system 870. Location stores may be used for storing location information received from client systems 830 associated with users. Advertisement-pricing modules may combine social information, the current time, location information, or other suitable information to provide relevant advertisements, in the form of notifications, to a user.

Example Computer System

Figure 9:
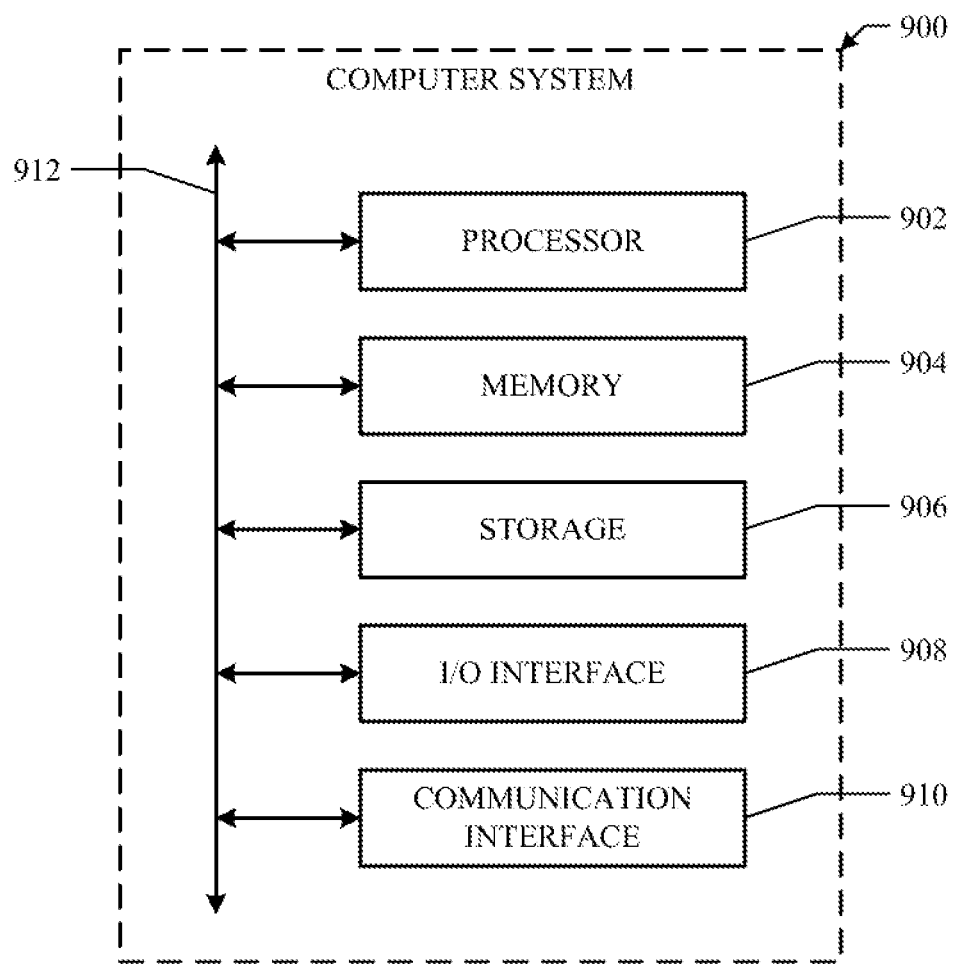
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate.

In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   receiving, by a first computing system, scene feedback information from a second computing system, the scene feedback information comprising one or more of characteristics associated with the second computing systems, one or more audio sources, and desired quality level for each of the one or more audio sources;
   adjusting, by the first computing system, a quality of an audio sample for transmission to the second computing system based on the scene feedback information;
   selecting, by the first computing system based on adjusted quality of the audio sample, a portion of hardware circuit on the first computing system for encoding the audio sample;
   encoding, by the first computing system using selected portion of the hardware circuit, the audio sample; and
   transmitting, by the first computing system via a particular communication protocol, encoded audio sample to the second computing system, wherein
   adjusting the quality of the audio sample comprises reducing a number of bits representing the audio sample,
   the hardware circuit comprises a plurality of power rails corresponding to different power and quality requirements, and
   selecting the portion of the hardware circuit comprises:
      activating a particular power rail from the plurality of power rails that corresponds to the reduced number of bits; and
      deactivating other power rails in the plurality of power rails that correspond to higher order bits.

2. The method of claim 1, wherein the desired quality level comprises one of:
   a high fidelity;
   a medium fidelity; and
   a low fidelity.

3. The method of claim 1, wherein adjusting the quality of the audio sample comprises:
   transforming numeric representation of the audio sample from a first number representation to a second number representation.

4. The method of claim 3, wherein transforming the numeric representation comprises:
   changing from a floating-point representation to a fixed-point representation or an integer-type representation.

5. The method of claim 3, wherein selecting the portion of the hardware circuit comprises:
   activating a certain power rail from the plurality of power rails that corresponds to the second number representation; and
   deactivating other power rails in the plurality of power rails that correspond to the first number representation.

6. The method of claim 1, further comprising:
   analyzing a scene associated with the first computing system;
   adjusting the quality of a second audio sample for local playback on the first computing system based on the scene associated with the first computing system; and
   selecting, based on the adjusted quality of the second audio sample, a second portion of the hardware circuit on the first computing system for the local playback.

7. The method of claim 6, wherein analyzing the scene associated with the first computing system comprises:
   determining characteristics associated with the first computing system, user of the first computing system, and an environment surrounding the first computing system;
   determining a number of audio sources including the one or more audio sources associated with the second computing system and one or more second audio sources associated with the first computing system;
   ranking the audio sources based on certain criteria;
   determining relevance of each audio source based on the ranking; and
   determining a quality or degradation level for each of the audio sources based on the relevance of the audio source and the characteristics.

8. The method of claim 1, wherein:
   the first computing system is a first artificial reality system; and
   the second computing system is a second artificial reality system.

9. The method of claim 8, wherein the one or more audio sources are associated with augmented calling between the first and second artificial reality systems.

10. The method of claim 1, wherein:
    the particular communication protocol is one of Bluetooth, Internet, Wi-Fi, cellular network, satellite communication protocol, radio communication protocol, or infrared communication protocol; and
    the encoded audio sample is transmitted via gaps between various data packets on the particular communication protocol.

11. One or more computer-readable non-transitory storage media embodying software that is operable when executed to:
    receive, by a first computing system, scene feedback information from a second computing system, the scene feedback information comprising one or more of characteristics associated with the second computing system, one or more audio sources, and desired quality level for each of the one or more audio sources;
    adjust a quality of an audio sample for transmission to the second computing system based on the scene feedback information by reducing a number of bits representing the audio sample;
    select, based on adjusted quality of the audio sample, a portion of hardware circuit on the first computing system for encoding the audio sample, wherein the hardware circuit comprises a plurality of power rails corresponding to different power and quality requirements, and the portion of hardware circuit is selected by activating a particular power rail from the plurality of power rails that corresponds to the reduced number of bits, and deactivating other power rails in the plurality of power rails that correspond to higher order bits;
    encode, using selected portion of the hardware circuit, the audio sample; and
    transmit, via a particular communication protocol, encoded audio sample to the second computing system.

12. The media of claim 11, wherein the desired quality level comprises one of:
    a high fidelity;
    a medium fidelity; and
    a low fidelity.

13. The media of claim 11, wherein to adjust the quality of the audio sample, the software is further operable when executed to:

transform numeric representation of the audio sample from a first number representation to a second number representation.

14. The method of claim 13, wherein transforming the numeric representation comprises:
changing from a floating-point representation to a fixed-point representation or a integer-type representation.

15. The method of claim 13, wherein to select the portion of the hardware circuit, the software is further operable when executed to:
activate a certain power rail from the plurality of power rails that corresponds to the second number representation; and
deactivate other power rails in the plurality of power rails that correspond to the first number representation.

16. A first computing system comprising:
one or more processors; and
one or more computer-readable non-transitory storage media coupled to one or more of the processors and comprising instructions operable when executed by one or more of the processors to cause the first computing system to:
receive scene feedback information from a second computing system, the scene feedback information comprising one or more of characteristics associated with the second computing system, one or more audio sources, and desired quality level for each of the one or more audio sources;
adjust a quality of an audio sample for transmission to the second computing system based on the scene feedback information by reducing a number of bits representing the audio sample;
select, based on adjusted quality of the audio sample, a portion of hardware circuit on the first computing system for encoding the audio sample, wherein the hardware circuit comprises a plurality of power rails corresponding to different power and quality requirements, and the portion of hardware circuit is selected by activating a particular power rail from the plurality of power rails that corresponds to the reduced number of bits, and deactivating other power rails in the plurality of power rails that correspond to higher order bits;
encode, using selected portion of the hardware circuit, the audio sample; and
transmit, via a particular communication protocol, encoded audio sample to the second computing system.

17. The first computing system of claim 16, wherein the desired quality level comprises one of:
a high fidelity;
a medium fidelity; and
a low fidelity.

18. The first computing system of claim 16, wherein to adjust the quality of the audio sample, the one or more processors are further operable when executing the instructions to cause the first computing system to:
transform numeric representation of the audio sample from a first number representation to a second number representation.

19. The first computing system of claim 18, wherein transforming the numeric representation comprises:
changing from a floating-point representation to a fixed-point representation or a integer-type representation.

20. The first computing system of claim 18, wherein to select the portion of the hardware circuit, the one or more processors are further operable when executing the instructions to cause the first computing system to:
activate a certain power rail from the plurality of power rails that corresponds to the second number representation; and
deactivate other power rails in the plurality of power rails that correspond to the first number representation.

* * * * *